UNITED STATES PATENT OFFICE.

AUGUSTE J. ROSSI, OF NEW YORK, N. Y., ASSIGNOR TO GEORGE H. ROBINSON, OF SAME PLACE.

PRODUCTION OF COLD.

SPECIFICATION forming part of Letters Patent No. 332,752, dated December 22, 1885.

Application filed June 27, 1885. Serial No. 169,934. (No specimens.)

*To all whom it may concern:*

Be it known that I, AUGUSTE J. ROSSI, of the city of New York, in the State of New York, have invented a new and useful Improvement in the Production of Cold, which is set forth in the following specification.

I have discovered that anhydrous carbonic acid or carbon dioxide ($CO_2$) and anhydrous sulphurous acid ($SO_2$) can be united with sulphuric ether by absorption, thus forming a compound volatile liquid, which I denominate a "ternary liquid," of great value in the production of artificial cold or ice; and the mode of producing cold or ice by the use of this compound volatile liquid I denominate the "ternary method," in distinction from the original binary method invented by C. M. Tessié du Motay and myself, and set forth in Patent No. 224,246 of February 3, 1880, to which this ternary method relates as a new and valuable improvement. In the use of this ternary liquid I avail myself of the discovery, made by me, that anhydrous carbonic acid or carbon dioxide ($CO_2$) is soluble in sulphuric ether, the use of which solution is the subject of a separate application for a patent.

By first dissolving anhydrous sulphurous acid ($SO_2$) in sulphuric ether, which is one of the preferable binary liquids mentioned in the Patent No. 224,246, and then dissolving anhydrous carbonic acid or carbon dioxide ($CO_2$) in this binary absorbent, I have found that more than twice as much carbonic acid is absorbed by this binary liquid as by sulphuric ether alone, while at the same time the pressure of this ternary liquid is not practically higher than that of the solution of carbonic acid in sulphuric ether alone, and the boiling-point of this ternary liquid is reduced greatly below that of either of the binary liquids formed by dissolving carbonic acid in sulphuric ether or sulphurous acid in sulphuric ether. The result of the new properties belonging to this ternary liquid is that by its use a much greater quantity of cold or ice is obtained for the same weight of liquid with a much less expenditure of mechanical power than by the use of either of the binary liquids before mentioned. Besides, the use of this ternary liquid has the important advantages of producing the same quantity of cold or ice as either of those binary liquids by means of an apparatus of greatly-reduced dimensions, and consequently of less cost of construction and maintenance. The use of this ternary liquid for making cold is also more economical than either of those binary liquids, as the ternary liquid is cheaper than the quantity of either of those binary liquids required for the production of the same amount of cold.

Ice-machines, by which name apparatus for the production of artificial cold is commonly known, are in great demand not only in temperate climates for the production of artificial cold, but also in tropical climates for the production of ice and cold. A natural obstacle stands in the way of the use of many of these machines in tropical climates. The temperature of the water of condensation circulating around the condenser limits the pressure by which the liquefaction of the vapor in the condenser is effected. In Calcutta, for example, the temperature of the water of condensation available for use is from 100° to 105° Fahrenheit, and the pressure of many liquefied vapors corresponding to that temperature is so great as to render the processes and apparatus involving the use of such vapors impracticable in such climate.

Ice-machines are extensively made and sold in this country for use in India and other tropical climates. Ammonia-machines, for instance, are quite commonly used in this country, but are impracticable in tropical climates, owing to the temperature of the water of condensation. The same is true of sulphurous-acid machines, though the pressure is less in their condensers.

It is practically necessary in tropical climates to employ processes and apparatus by which the pressure is reduced within the limit of the temperature of the water of condensation; and in temperate climates great advantages are attained by the use of processes and apparatus by which the pressure is reduced without diminishing the production of cold. Among them may be named the facility of management of the apparatus and economy of fuel and use of the process. All these requirements and advantages are fulfilled and attained in a marked degree by the use of the compound volatile liquid herein described.

Of other processes, that which approximates nearest to the ternary method is the use of the solution of carbonic acid in sulphuric ether; but the ternary liquid is superior to that solution in the increased production of cold with the same apparatus without corresponding increase of mechanical power or pressure, and with greater economy of the refrigerating agent. The quantity of sulphurous acid and carbonic acid absorbed by the sulphuric ether increases as the pressure at which the solution is made is increased.

At atmospheric pressure a suitable ternary liquid is made by dissolving about forty pounds of anhydrous sulphurous acid ($SO_2$) in about sixty pounds of sulphuric ether, and saturating this binary liquid with carbonic acid, of which from two to three pounds will be absorbed. This compound may be made in the refrigerator of the apparatus or in a carboy or other suitable vessel provided with a pressure-gage, and charged from it into the refrigerator. I vary the proportions of each constituent in making the ternary liquid below or above atmospheric pressure, according to the climate or temperature of the water of condensation where the ice-machine is to be used or the specific purpose of using it.

What I claim as new, and desire to secure by Letters Patent, is—

The use of a ternary liquid consisting of carbonic acid combined with a binary volatile absorbent for the production of cold, substantially as described.

AUGUSTE J. ROSSI.

Witnesses:
MARSHALL E. STEWART,
MARCELLUS C. HEATH.